United States Patent
Koudas et al.

(10) Patent No.: US 8,645,397 B1
(45) Date of Patent: Feb. 4, 2014

(54) METHOD AND APPARATUS FOR PROPAGATING UPDATES IN DATABASES

(75) Inventors: Nikolaos Koudas, Toronto (CA); Amit Jaywant Marathe, Chicago, IL (US); Divesh Srivastava, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 430 days.

(21) Appl. No.: 11/565,491

(22) Filed: Nov. 30, 2006

(51) Int. Cl.
*G06F 7/00* (2006.01)
*G06F 17/00* (2006.01)
*G06F 17/30* (2006.01)

(52) U.S. Cl.
USPC .......................... 707/750; 707/728; 707/730

(58) Field of Classification Search
USPC .......... 707/100, 102, 200, 3, 4, 5; 714/42, 47, 714/48; 709/203; 705/26
See application file for complete search history.

(56) References Cited

U.S. PATENT DOCUMENTS

| | | | |
|---|---|---|---|
| 6,003,027 A * | 12/1999 | Prager | 707/5 |
| 6,249,883 B1 * | 6/2001 | Cassidy et al. | 714/42 |
| 6,282,538 B1 * | 8/2001 | Woods | 1/1 |
| 6,393,460 B1 * | 5/2002 | Gruen et al. | 709/204 |
| 6,473,730 B1 * | 10/2002 | McKeown et al. | 704/9 |
| 6,654,739 B1 * | 11/2003 | Apte et al. | 707/5 |
| 7,028,037 B1 * | 4/2006 | Agarwal et al. | 707/100 |
| 7,962,487 B2 * | 6/2011 | Liu et al. | 707/737 |
| 2003/0014399 A1 * | 1/2003 | Hansen et al. | 707/3 |
| 2005/0137939 A1 * | 6/2005 | Calabria et al. | 705/26 |
| 2006/0143175 A1 * | 6/2006 | Ukrainczyk et al. | 707/6 |
| 2006/0242190 A1 * | 10/2006 | Wnek | 707/102 |
| 2006/0282456 A1 * | 12/2006 | Kapoor et al. | 707/102 |
| 2008/0077570 A1 * | 3/2008 | Tang et al. | 707/5 |
| 2009/0112830 A1 * | 4/2009 | Denoue et al. | 707/4 |

* cited by examiner

*Primary Examiner* — Susan Chen

(57) ABSTRACT

A method and apparatus for propagating updates in databases are disclosed. For example, the present method uses "blocking" and/or "thresholding" to delay update propagation and/or to limit the propagation of updates to an optimal stage. For example, the present method receives at least one database update and extracts at least one token from the at least one database update. The method then determines whether a threshold for propagating the at least one database update for the at least one token is reached. The method then propagates the at least one database update for updating an index structure of a database pertaining to the at least one token whose threshold has been reached.

9 Claims, 3 Drawing Sheets

METHOD AND APPARATUS FOR PROPAGATING UPDATES IN DATABASES

The present invention relates generally to data processing and, more particularly, to a method and apparatus for propagating updates in databases.

BACKGROUND OF THE INVENTION

Businesses and consumers rely on information processing infrastructures for accessing and sharing information. The information or data is often organized and kept in records for ease of access by multiple users or applications. When the collection of information is organized in electronically accessible records, it is managed and updated by computers. These electronically accessible records can be stored into operational databases. The information in the operational databases is often represented as strings. For example, customer names, addresses, etc. are represented in the databases as strings. However, the information may be represented differently across related databases. As a result, applications retrieving such data may utilize flexible string matching tools that maintain indexes over the database tables. However, these databases are often extremely large (e.g., containing possibly tens of millions of records) and updates to the databases may occur frequently. For example, the databases are continuously being accessed and modified by multiple applications. In order to take into account the updates in the underlying database tables, the tools may need to re-compute the indexes. Unfortunately, the processing cost of re-computing the indexes in such a dynamically updated database is computationally expensive.

Therefore, there is a need for a method that efficiently propagates updates in flexible string matching tools.

SUMMARY OF THE INVENTION

In one embodiment, the present invention discloses a method and apparatus for propagating updates in databases. For example, the present method uses "blocking" and/or "thresholding" to delay update propagation and/or to limit the propagation of updates to an optimal stage. For example, the present method receives at least one database update and extracts at least one token from the at least one database update. The method then determines whether a threshold for propagating the at least one database update for the at least one token is reached. The method then propagates the at least one database update for updating an index structure of a database pertaining to the at least one token whose threshold has been reached.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
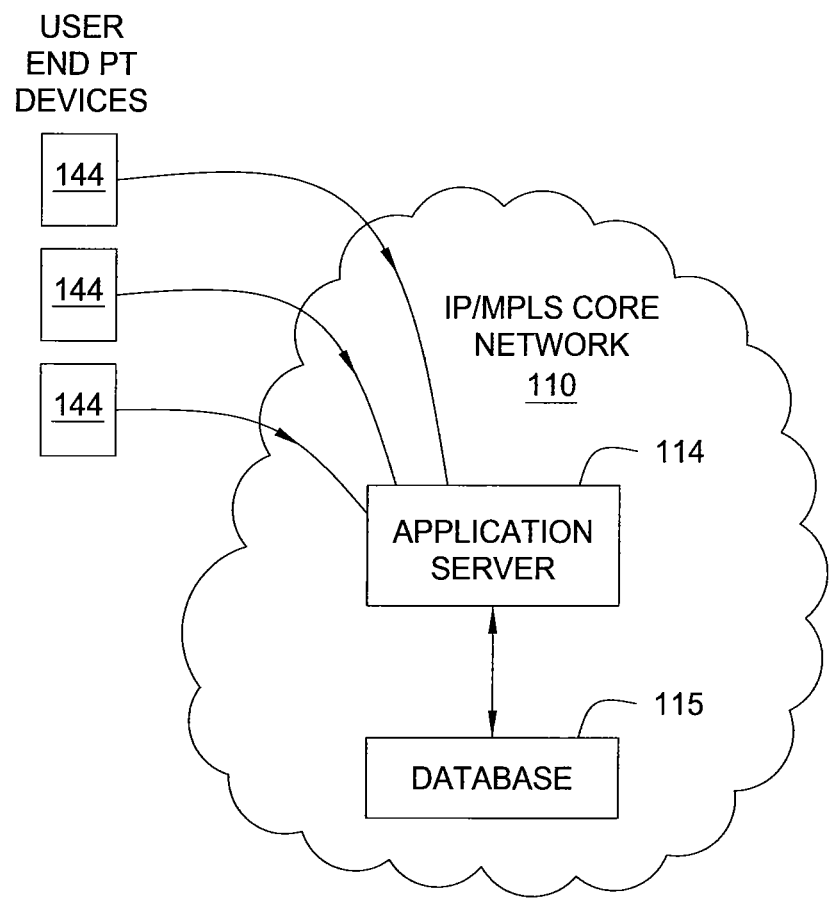
FIG. 1 illustrates an exemplary network of the current invention for propagating updates in databases.

Generally, information or data is organized and kept in records for ease of access by multiple users or applications. When the collection of information is organized in electronically accessible records, it is managed and updated by computers. These electronically accessible records can be stored into operational databases. The efficiency of information processing systems is greatly affected by the quality of the data residing in these databases.

For example, data quality issues may instigate a variety of business problems, such as inefficient customer relationship management, billing errors, distribution delays, etc. An example of a typical business problem encountered is that customer information e.g., individual names, corporation names, addresses, etc. is represented differently across related databases. In another example, data quality issues may exist in a database relating to the accuracy of product names, product descriptions, etc. Often, the information is represented in the databases as strings. Applications retrieving such data may utilize matching tools to enable flexible matching of strings in the databases to queries.

In one embodiment, a tool may use Term Frequency-Inverse Document Frequency (TF.IDF) and cosine similarity measures, as described below, to match queries to strings. For example, a tool may be used for matching attribute values such as customer names, addresses, etc. in large databases. Tools using TF.IDF measures maintain indexes over the database tables containing string tokens and their TF.IDF weights for matching the queries and strings. The TF.IDF weights maintained in the indexes are dependent on both the total number of records in a table and the distribution of occurrences of string tokens in the records. However, these databases are often extremely large (e.g., containing possibly tens of millions of records) and updates to the databases may occur frequently. For example, the databases are continuously being accessed and modified by multiple applications. In order to take into account the updates in the underlying database tables, the tools may need to re-compute the indexes. Unfortunately, the processing cost of re-computing the indexes in such a dynamically updated database is computationally expensive. At the same time, if the indexes are not re-computed, then the accuracy of the responses to queries may be reduced, thereby potentially impacting the performance of a business. Therefore, there is a need for a method that propagates updates in flexible string matching tools while maintaining response accuracy.

In one embodiment, the current invention provides a method and apparatus for propagating updates in databases. In order to clearly illustrate the present invention, the following database and data quality concepts will first be described. These concepts are that of:

Token;
Term Frequency (TF);
Document Frequency (DF);
Inverse Document Frequency (IDF); and
Term Frequency-Inverse Document Frequency (TF.IDF).

A token refers to an identifiable unit of information. Some examples of tokens are words, phrases, etc. Tokens may vary from application to application.

Term Frequency (TF) refers to a measure of the occurrence frequency of the term within a particular document. It should be noted that the term document can be interpreted broadly to include one or more records. The term may be a token such as a word, a phrase, etc. In one embodiment, the TF of a word or token is determined by dividing the number of times the word or token appears in a document by the number of words or tokens in the document.

Document Frequency (DF) is a measure of the commonality of a token. In one embodiment, DF may be calculated by dividing the number of documents containing a token by the total number of documents in the database.

Inverse Document Frequency (IDF) is also a measure of the commonality of a token in a database. It should be noted that IDF may be calculated in various ways. In one example, the IDF for a token is determined by dividing the total number of documents in the database by the total number of documents that contain the token. In another example, the IDF is determined by first dividing the total number of documents in the database by the total number of documents that contain the token and then taking the logarithm of the result (base 10). For example, if the database contains 100 documents and the token is in all 100 documents, then the IDF is equal to zero (Log(100/100)). Note that IDF assigns common tokens a lower value and rare tokens a higher value.

Term Frequency-Inverse Document Frequency (TF.IDF) refers to a method that uses weights to quantify the importance of an attribute value (e.g., a token, etc.) to a document. For example, the importance increases proportionally to the number of times the token appears in the document, but is offset by the frequency or commonality of the token in the database. For example, a database containing a list of corporations may have a large count of the token "corporation" and a query may not give relevance to this particular token, as it is common in the database. However, if the database contains addresses and the query included "corporation", a database entry such as "Corporation Street" is a good match. Hence, the relevance of the particular word or token "corporation" is quantified by assigning it a higher weight. Term Frequency-Inverse Document Frequency (TF.IDF) is then a method that uses weights to find the most relevant documents to a user's query. Formally defined, the TF.IDF for a particular token is determined by multiplying the TF and IDF of the token.

An example of an algorithm for implementation of TF.IDF flexible string matching is provided below. Note that the present invention may be implemented in various ways and the algorithm below is an illustrative example and is not intended to limit the present invention.

Let "Base" denote a base table with a string-valued attribute "sva" against which the flexible matching needs to be performed, and let "Search" denote a table containing one or more search strings. Flexible string matching is performed in two stages:

At pre-processing time; and
Query time.

At pre-processing time, the Base table is pre-processed, and tokens (e.g., words, phrases, q-grams, etc.) are extracted from each database string in "Base.sva." A variety of auxiliary tables can be created, to compute the IDFs of each token, and ultimately to associate each database string s with a (normalized) weight vector incorporating both TF and IDF corresponding to the tokens extracted from s.

In one example, the tokens are extracted from the string values in "Base.sva" and the results are stored in a Term Frequency (TF) table called "BaseTF." The "BaseTF" may include the Term Identifier (TID) in the "Base" table, the token and the TF. The TID uniquely identifies the string in the "sva" attribute of that table and TF provides the number of occurrences of the token in that string. Also, for simplicity of exposition, assume that a table "BaseSize(size)" contains a single one-attribute record containing a count of the number of records in "Base."

Each token is then associated with a weight (IDF) that reflects its commonality in the database, where common tokens are assigned a low weight, and uncommon tokens are assigned a high weight. An example of the algorithm for weight assignment and insertion into a table "BaseIDF(token, idf)" is shown below:

Insert into BaseIDF(token, IDF)
select T.token, LOG(S.size)−LOG(COUNT(T.TID))
from BaseTF T, BaseSize S
group by T.token Once the IDFs have been computed, and the TFs are known from the BaseTF table, the weight vector corresponding to a string is computed by associating the product TF*IDF with each token extracted from the string. However, this would result in an un-normalized weight vector. Therefore, before computing this vector, the algorithm below computes a normalization term for each TID as the $l_2$-norm (length in the Euclidean space) of the un-normalized weight vector. For example, this is computed into the table "BaseLength(TID, len)" as shown below:

Insert into BaseLength(TID, len)
select T.TID,
  SQRT(SUM(I.IDF*I.IDF*T.TF*T.TF))
from BaseTF T, BaseIDF I
where T.token=I.token
group by T.tid For example, the normalized weight vector, associated with each string, is then computed into the table BaseWeights (TID, token, weight) as follows:

Insert into BaseWeights(TID, token, weight)
select T.TID, T.token, T.tf*I.idf/L.len
from BaseTF T, BaseIDF I, BaseLength L
where T.token=I.token
  and T.TID=L.TID Generally, when a query string is received, tokens are extracted from the string and weight vectors are computed for the tokens corresponding to the received query string. The matching records and their associated similarity scores are then determined by computing the inner products of the weight vectors of the query string with those of the database strings. The records that exceed a pre-specified similarity threshold are identified and the search results for the query are presented to the user.

Thus, at query time, a similar process is done with respect to the Search table. For example, a Structured Query Language (SQL) query that operates on the auxiliary tables created from "Base" and "Search" is executed, which identifies the matching records, along with their similarity score. This is accomplished by computing the inner product of the weight vectors of the search string with the weight vectors of the database strings in "Base.sva", while taking the weights of the common tokens into account. For example, given a query string in the Search(sva) table, the above sequence of steps performed during pre-processing are performed to compute a table for search, SearchWeights(TID, token, weight). Note that the BaseIDF table is used to obtain the IDFs of the tokens extracted from the search string, to ensure that the data in the database table drives the weight vector associated with the search string. An illustrative algorithm for baseline query (for computing all matches and scores), for database entries whose scores exceed a pre-specified similarity threshold T, is given below:

Select S.TID, B.TID, SUM(S.weight*B.weight)
from SearchWeights S, BaseWeights B
where S.token=B.token
group by S.TID, B.TID
having SUM(S.weight*B.weight)>T Table 1 provides an example of a database table that has been indexed to answer flexible string matching queries.

TABLE 1

Example of a Database with Company Names
Company Name

3M Corp
Alcoa
American Intl Group
Philip Morris
American Express
Boeing
Caterpillar
CitiGroup
Coca Cola
DuPont de Nemours
Exxon Mobil
General Electric
General Motors
Hewlett-Packard
Home Depot
Honeywell International
Intel
International Business Machines
JP Morgan Chase
Johnson & Johnson
McDonalds
Merck
Microsoft
Pfizer
Procter and Gamble
SBC Communications
United Technologies
Verizon Communications
Wal-Mart Stores
Walt Disney When a database is very large, finding all documents that contain a token may take an unacceptable amount of time. Database search algorithms speed up the search by computing a data structure called "document index" in advance. For the above example, enabling updates on the table while still answering queries involves updating the document index for each update to the "Base" table. For example, the set of strings in Table 1 contain 328 tokens (3-grams). Most of the tokens occur in just one tuple while only a handful of tokens occur in more than 4 tuples. Table 2 provides the distribution of the token Document Frequency (DF) for the above example with company names.

TABLE 2

Distribution of DF of 3-gram Tokens

| DF | Number of tokens |
|---|---|
| 1 | 255 |
| 2 | 47 |
| 3 | 22 |
| 4 | 3 |
| 10 | 1 |

In the above example, if "American Intl Group" is changed to "American International Group", the DF of tokens obtained from "International" increases. Those tokens occur in 2 other tuples and hence the normalized weights of those tuples also changes. But since these tokens have a relatively high DF (low IDF) to start with, such changes will ultimately have a low effect on the final normalized weights or scores.

In another example, consider the name change from "Philip Morris" to "Altria" in Table 1. The tokens involved in this change all have a low DF (high IDF). Hence, the number of tuples in the database affected by this change is small. However, those tuples that are affected are likely to have changed their normalized weights significantly.

As shown in the pre-processing algorithm above, the IDF for every token depends on the size of the "Base" table. Therefore, adding or deleting even a single tuple changes the entire BaseIDF table. The change in the BaseIDF causes all the tuples in BaseLength to change as well, which cascades into a change of all the tuples in BaseWeights. Similarly, a change in the document frequency of a single token, propagates to many tuples in BaseWeights. For example, a change in the DF of a token appearing in 10% of the tuples leads to a change in 10% of the tuples in BaseWeights.

To address this criticality, the current invention provides an efficient method for propagating updates. In one embodiment, the present method contains the effects of updates to the BaseDF table and provides an index table structure that isolates the dependency on BaseSize. The effects of updates to the BaseDF table and changes to the BaseSize can be contained by using a "blocking" method and/or a "thresholding" method.

In the "blocking" method, updates to the weights are not processed as they arrive. Instead, updates are held in a buffer and processed together as a batch only after a sufficient number of updates are collected. The rationale for this approach is that an individual update changes the final weights by a very small amount and hence batching the updates results in a more efficient processing method (e.g., at the cost of small errors in accuracy). Note that documents are added to the database regardless of the updates in the weights. For example, a query execution would return documents added after the last updates in the weight calculation. Hence, the costly re-computation of the weights is buffered for batch processing while other updates are unaffected. Furthermore, since the affected tokens are identified, the re-computation of the weights may be accomplished for the affected documents alone.

In the "thresholding" method, changes to the BaseSize are processed on arrival based on an index table structure that isolates the dependency on BaseSize. Index structures that require full re-computation for every addition/deletion are not amenable for incremental propagation of updates. The current invention isolates the effects of size changes and stops the cascading effect.

An example of SQL for incremental propagation of updates is provided below. First, 3 new tables may be created as follows:
BaseDF(token, DF);
BaseRawWeights(TID, token, TF, DF); and
BaseRawLength(tid, s1, s2, s3).

In one embodiment, BaseDF stores the document frequency corresponding to each token. BaseRawWeights is the join of BaseTF and BaseDF on the token column. To understand how BaseRawLength is populated, let L be the length of some tuple. Then, $$L = \sum_i tf_i^2 * idf_i^2$$

$$= \sum_i tf_i^2 * (\log(size) - \log(df_i))^2$$

$$= \log^2(size) \sum_i tf_i^2 -$$

$$2\log(size) \sum_i tf_i^2 * \log(df_i) +$$

$$\sum_i tf_i^2 * \log^2(df_i)$$

where, size is the number of tuples in the "Base" table and the summation is over all the tokens in that particular tuple. Thus, L may be expressed as $\log^2(size)s1 - 2\log(size)s2 + s3$ where s1, s2 and s3 depend on the tokens in a tuple and are independent of size. An example of an SQL for populating the new set of tables is given below:

```
insert into BaseDF(token, IDF)
select T.token, LOG(COUNT(T.TID))
from BaseTF T
group by T.token
insert into BaseRawWeights(TID, token, TF, DF)
select T.TID, T.token, T.TF, D.DF
from BaseTF T, BaseDF D
where T.token=D.token
insert into BaseRawLength(TID, s1, s2, s3)
select T. TID, SUM(T.TF*T.TF), SUM(T.TF*T.TF*
    D.DF), SUM(T.TF*T.TF*D.DF*D.DF)
from BaseTF T, BaseDF D
    where D.token=T.token
    group by T. TID
insert into BaseLength(TID, length)
select RL. TID,
    sqrt(S.size*S.size*RL.s1−2*S.size*RL.s2+RL.s3)
from BaseRawLength RL, BaseSize S
insert into BaseWeights(TID, token, weight)
select RW. TID, RW.token, RW.TF*(S.size−RW.DF)/
    L.length from BaseRawWeights RW, BaseSize S, Base-
    Length L
where RW.TID=L. TID
```

The new set of tables may be arranged in 4 stages, as shown in Table 3, with tables in a stage computed from tables in earlier stages.

TABLE 3

Partitioning Flexible String Matching Tables into Stages

| Stage | Table |
|---|---|
| 1 | BaseTF |
|   | BaseDF |
|   | BaseSize |
| 2 | BaseRawWeights |
|   | BaseRawLength |
| 3 | BaseLength |
| 4 | BaseWeights |

In one embodiment, the current invention utilizes the index structure with stages to delay propagation of updates. For example, changes to the BaseSize, BaseTF and BaseDF tables are performed on arrival of updates, as they are grouped in Stage 1. The new DFs are then compared to the old DFs and the tokens whose DF has changed by a significant amount are identified, e.g., an example of a significant amount is 5-10%. In one embodiment, the tables in all the stages are updated at the same time. In another embodiment, downstream tables in stages 2, 3 and 4 are updated when the corresponding DFs have changed significantly. In one embodiment, various thresholds for DF updating are set for each stage, e.g., the thresholds can be set at 5-10%.

The propagation of updates in stages reduces update processing time and cost of computations. The cost of propagating updates can be ameliorated using two design tradeoffs: 1) cost of updates versus accuracy tradeoff, and/or 2) relative frequency of queries versus updates.

Cost of updates versus accuracy tradeoff refers to a tradeoff between the accuracy of responses to FSM queries and the cost incurred when propagating updates from the database table to the indexes needed for responding to FSM queries. The cost of propagating updates is reduced by delaying the propagation of updates using "blocking" and/or "thresholding" methods, without adversely impacting the accuracy.

Relative frequency of queries versus updates tradeoff refers to a balance of update cost against query cost. If updates are infrequent as compared to queries, it may be beneficial to perform the individual updates to minimize the cost of individual queries. On the contrary, if queries are infrequent, it may be beneficial to reduce the cost of individual updates.

In one embodiment, the present invention determines an "optimal stage" to which the update propagation needs to be performed by optimizing the weighted average total cost of updates and FSM queries and by setting thresholds. The FSM queries are structured to run on any stage based on the table dependencies as defined above in Tables 1 through 3.

FIG. 1 illustrates an exemplary network 100 with the current invention for propagating updates in databases. For example, a service provider may implement the present invention for propagating updates in an application server 114. Users using the user endpoint devices 144 may send queries to the service provider to obtain information and/or to modify information stored in a database 115 in the service provider's IP/MPLS network 110. For example, the application server 114 receives the queries and interacts with the users. The index structure, and the "blocking" and/or "thresholding" methods as discussed above can be implemented in the application server 114 for propagating updates.

Figure 2:
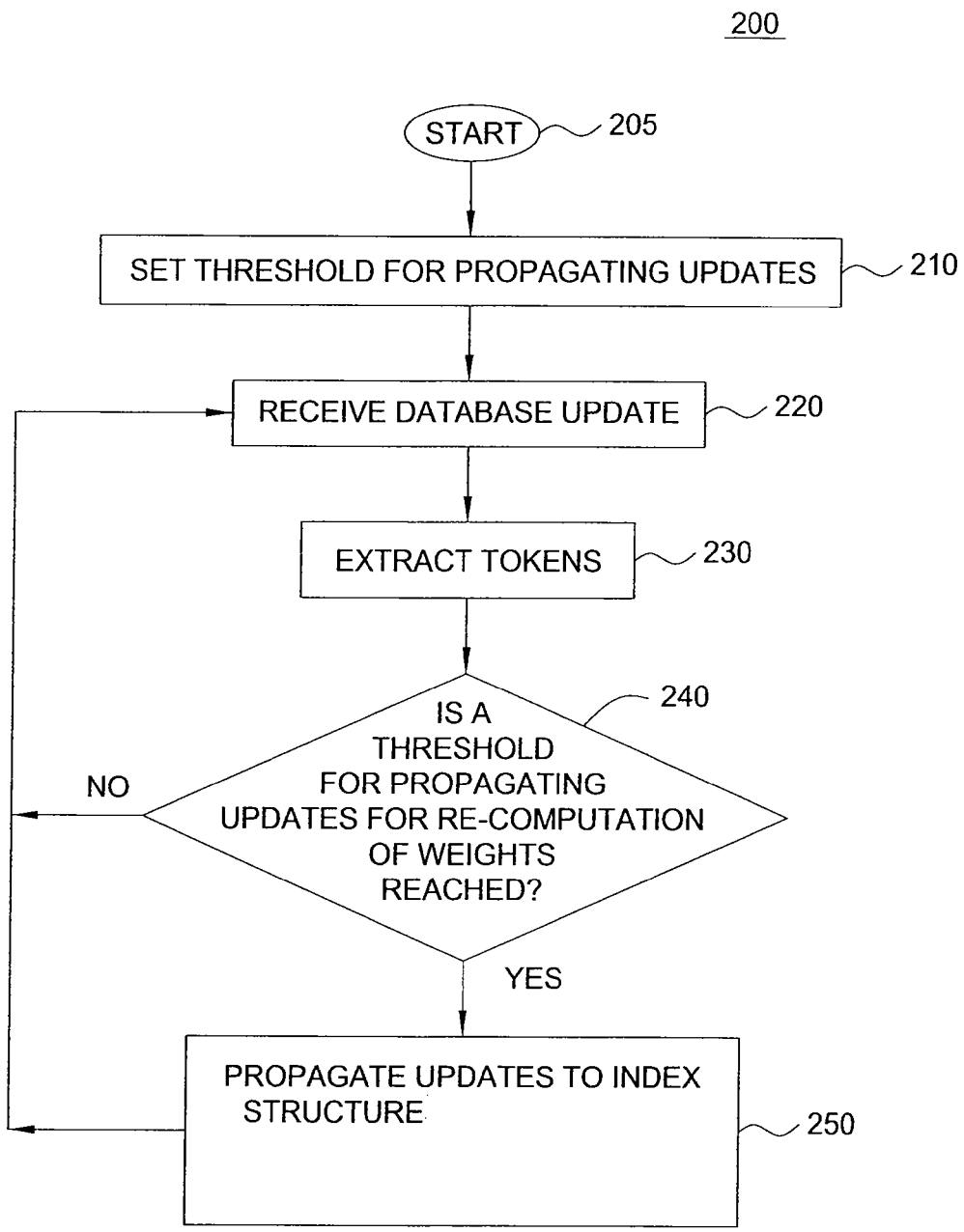
FIG. 2 illustrates a flowchart of a method for propagating updates.

FIG. 2 illustrates a flowchart of the method 200 for propagating updates in databases. Method 200 starts in step 205 and proceeds to step 210.

In step 210, method 200 sets thresholds for propagating updates. For example, for an index structure with multiple stages (e.g., as shown in Table 3 above), the method may set a different threshold for each stage, e.g., the threshold can be set at 5-10%. In another embodiment, a predefined interval for implementing the "blocking" method may be set based on a predefined time period or a predefined volume of updates, e.g., every minute, every 30 minutes, every 100 changes to the database, and the like. The method then proceeds to step 220.

In step 220, method 200 receives database updates. The updates may be additions, deletions, and/or modifications, represented as strings. For example, a new document to be added to the database may be received. The method then proceeds to step 230.

In step 230, method 200 extracts tokens from the received strings. The tokens may be words, phrases, and the like that can be used for matching responses to queries. The method then proceeds to step 240.

In step 240, method 200 determines whether or not a threshold for propagating updates for re-computation of weights of the index structure is reached. For example, if an index structure with various stages is used, the method identifies the tokens whose document frequency has changed above a pre-determined threshold. In another example, the method may determine whether or not a batch update should be performed when updates are accumulated via the "blocking" method. If the threshold for update propagation is reached, then the method proceeds to step 250. Otherwise, it proceeds back to step 220 to continue receiving database updates.

In step 250, method 200 propagates updates to the index structure for re-computation of weights. The method then proceeds back to step 220 to continue receiving database updates.

Although the illustrative example above provides separate devices for functions such as data storage and user/query interaction, those skilled in the art would realize the same server may be used for multiple functions.

Figure 3:
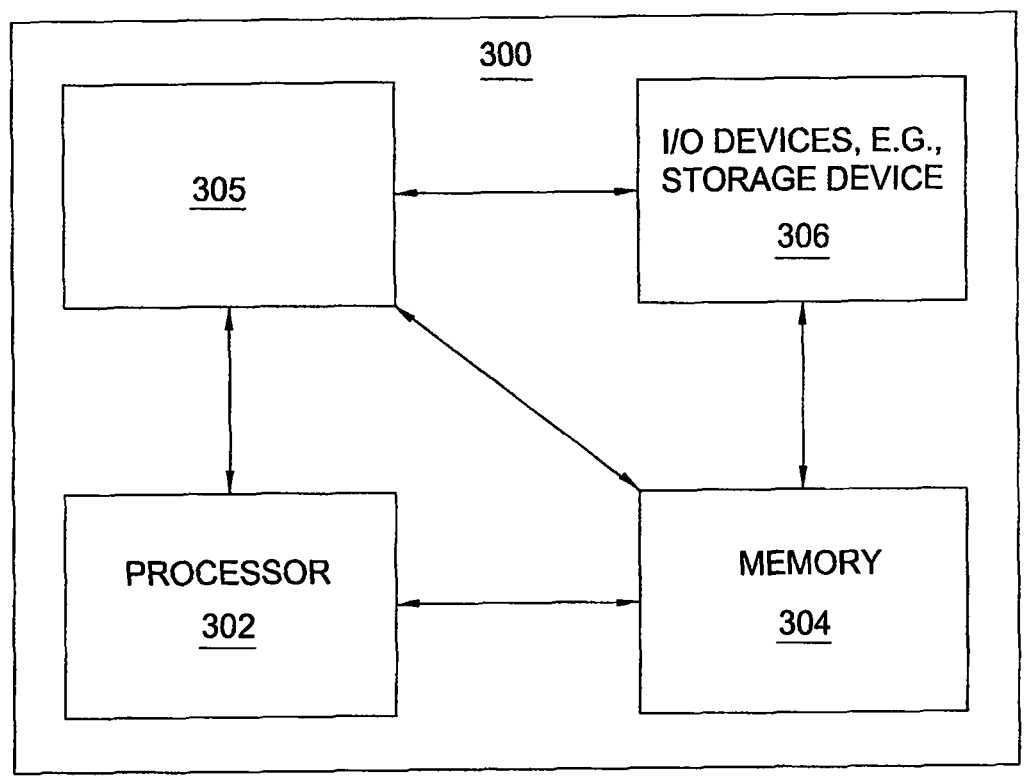
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for propagating updates in databases, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for propagating updates in databases can be loaded into memory 304 and executed by processor 302 to implement the functions as discussed above. As such, the present method 305 for propagating updates in databases (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for propagating a database update in a database, comprising:

receiving, by a processor, the database update;

extracting, by the processor, a token from a string of the database update;

determining, by the processor, whether a threshold for propagating the database update for the token for updating an index structure is reached, wherein the index structure comprises a plurality of tables, wherein the updating the index structure comprises updating the plurality of tables, wherein the updating the index structure further comprises updating a plurality of weights of the index structure, wherein the plurality of weights is associated with a plurality of tokens found in the database, wherein a table of the plurality of tables is updated in accordance with whether a change of a document frequency of the token has reached the threshold, wherein a table of the plurality of tables is populated by a length of the string, wherein the length of the string is computed in accordance with:

$$L = \sum_i tf_i^2 * idf_i^2$$

wherein L represents the length of the string,
wherein i represents a particular token of a plurality of tokens in the string,
wherein $tf_i$ represents a number of occurrences of the particular token i in the string,
wherein $idf_i$ represents an inverse document frequency of the particular token i in the string; and propagating, by the processor, the database update for re-computing the plurality of weights of the index structure of the database pertaining to the token whose threshold has been reached.

2. The method of claim 1, wherein the threshold is premised on a predefined number of the database update containing the token having been received.

3. The method of claim 1, wherein the threshold is premised on a predefined time period.

4. A tangible computer-readable medium storing a plurality of instructions which, when executed by a processor, cause the processor to perform operations for propagating a database update in a database, the operations comprising:

receiving the database update;

extracting a token from a string of the database update;

determining whether a threshold for propagating the database update for the token for updating an index structure is reached, wherein the index structure comprises a plurality of tables, wherein the updating the index structure comprises updating the plurality of tables, wherein the updating the index structure further comprises updating a plurality of weights of the index structure, wherein the plurality of weights is associated with a plurality of tokens found in the database, wherein a table of the plurality of tables is updated in accordance with whether a change of a document frequency of the token has reached the threshold, wherein a table of the plurality of tables is populated by a length of the string, wherein the length of the string is computed in accordance with:

$$L = \sum_i tf_i^2 * idf_i^2$$

wherein L represents the length of the string,
wherein i represents a particular token of a plurality of tokens in the string,
wherein $tf_i$ represents a number of occurrences of the particular token i in the string,
wherein $idf_i$ represents an inverse document frequency of the particular token i in the string; and propagating the database update for re-computing the plurality of weights of the index structure of the database pertaining to the token whose threshold has been reached.

5. The tangible computer-readable medium of claim 4, wherein the threshold is premised on a predefined number of the database update containing the token having been received.

6. The tangible computer-readable medium of claim 4, wherein the threshold is premised on a predefined time period.

7. An apparatus for propagating a database update in a database, comprising:

a processor; and a computer-readable medium storing a plurality of instructions which, when executed by the processor, cause the processor to perform operations, the operations comprising:

receiving the database update;

extracting a token from a string of the database update;

determining whether a threshold for propagating the database update for the token for updating an index structure is reached, wherein the index structure comprises a plurality of tables, wherein the updating the index structure comprises updating the plurality of tables, wherein the updating the index structure further comprises updating a plurality of weights of the index structure, wherein the plurality of weights is associated with a plurality of tokens found in the database, wherein a table of the plurality of tables is updated in accordance with whether a change of a document frequency of the token has reached the threshold, wherein a table of the plurality of tables is populated by a length of the string, wherein the length of the string is computed in accordance with:

$$L = \sum_i tf_i^2 * idf_i^2$$

wherein L represents the length of the string,
wherein i represents a particular token of a plurality of tokens in the string, wherein $tf_i$ represents a number of occurrences of the particular token i in the string, wherein $idf_i$ represents an inverse document frequency of the particular token i in the string; and propagating the database update for re-computing the plurality of weights of the index structure of the database pertaining to the token whose threshold has been reached.

8. The apparatus of claim 7, wherein the threshold is premised on a predefined number of the database update containing the token having been received.

9. The apparatus of claim 7, wherein the threshold is premised on a predefined time period.

* * * * *